UNITED STATES PATENT OFFICE.

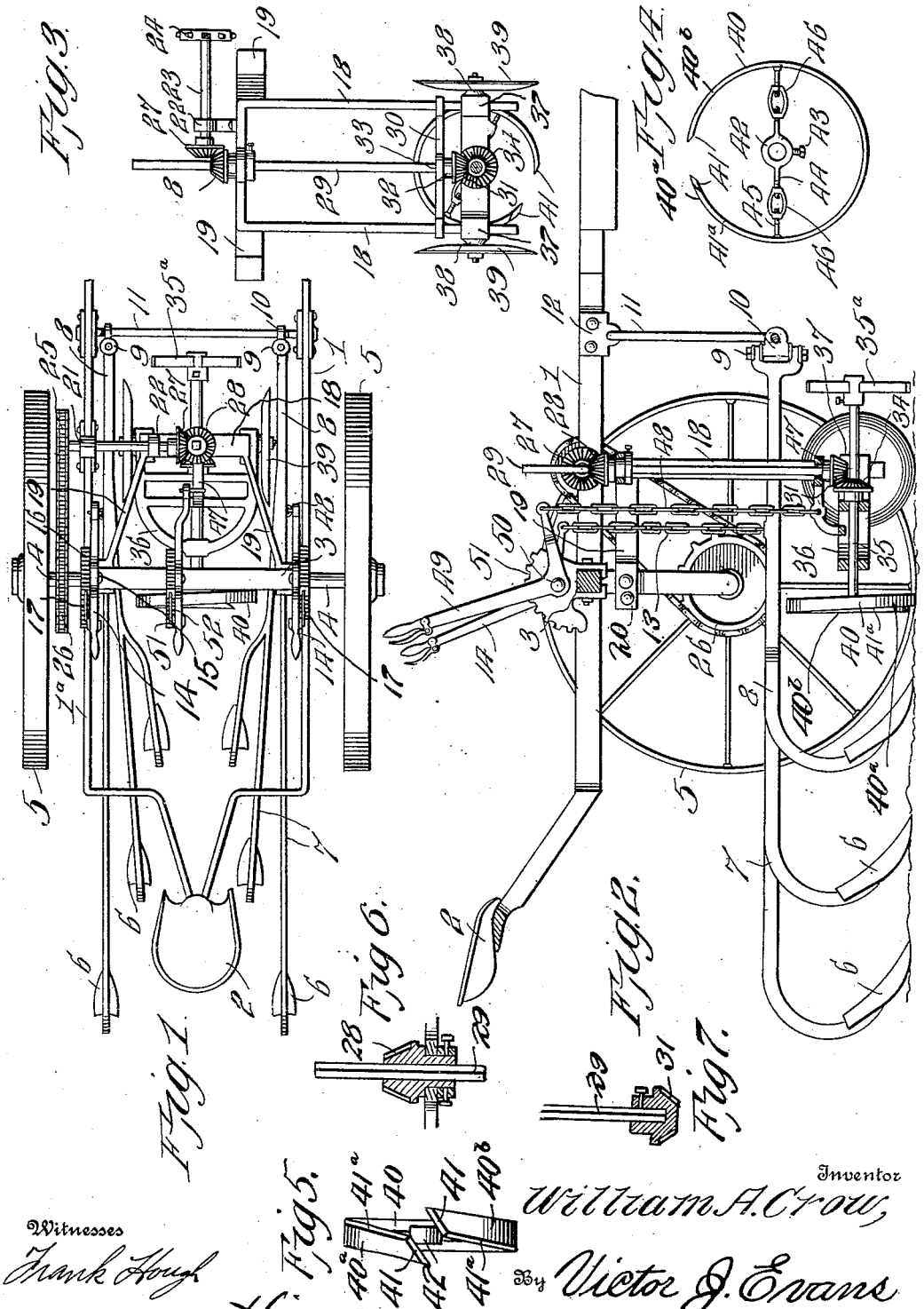

WILLIAM A. CROW, OF CEMENT, OKLAHOMA.

COTTON-CHOPPER.

941,230.  Specification of Letters Patent.  Patented Nov. 23, 1909.

Application filed September 23, 1908. Serial No. 454,393.

*To all whom it may concern:*

Be it known that I, WILLIAM A. CROW, a citizen of the United States, residing at Cement, in the county of Caddo and State of Oklahoma, have invented new and useful Improvements in Cotton-Choppers, of which the following is a specification.

This invention relates to cotton choppers, the object of the invention being to provide a simple and efficient construction of cotton chopping mechanism which may be combined with cultivating devices on a common main frame or applied to existing cultivators, one in which the provision is made for simultaneously cutting out the weeds and trash to clear the way for the chopper, and one in which an improved type of rotary chopper is employed together with means for adjusting said chopper and the weed cutters as occasion requires.

With these and other objects in view, the invention consists of the features of construction, combination and arrangement of parts hereinafter fully described and claimed, reference being had to the accompanying drawing, in which:—

Figure 1 is a top plan view of a combined cotton chopper and cultivator embodying my invention. Fig. 2 is a vertical longitudinal section of the same. Fig. 3 is a front elevation of the chopping mechanism detached. Fig. 4 is a detail view of the rotary chopper. Fig. 5 is a detail view of the rotary cutter. Figs. 6 and 7 are detail views showing the mode of mounting the upper and lower bevel gears on the vertical shaft of the attachment.

Referring to the drawing, 1 designates a main supporting frame, carrying a driver's seat 2 and provided with an arched axle 3 having end spindles 4 on which are journaled ground wheels 5. These wheels are arranged to come on opposite sides of the row from which the cotton is to be thinned, while the frame straddles the row.

The frame may be of an ordinary type employed in the construction of cultivating implements of the type especially designed for cultivating cotton, and both cultivating and chopping devices may be mounted upon this frame to both thin and cultivate the cotton simultaneously. As herein shown, a series or gang of cultivator shovels 6, arranged at different distances apart and one in rear of the other, are provided and supported by standards or extensions 7 extending from a pair of oppositely arranged main beams 8, said beams being pivotally connected for lateral movement, as at 9, to knuckles 10 pivotally mounted for rocking movement in a vertical plane upon the lower cross bar of a U-shaped bracket 11, the upper ends of the vertical arms of which are bent laterally and pivotally mounted in bearing plates 12 on the side bars 1ª of the main frame 1. Each beam is attached to the lower end of a chain 13, which is connected at its upper end with a bell crank lever 14 journaled on a pivot pin or bolt 15 carried by a segment rack 16 suitably secured to the horizontal portion of the arched axle 3, said lever being provided with a pawl 17 to engage the teeth of the rack bar. By means of the levers 14 and the chains 13 connecting the same with the beams 8, the beams are permitted to have a determined lateral, vertical, and longitudinal movement, and are adapted to be adjusted vertically to throw the cultivator shovels out of operation and to regulate their depth of penetration of the soil.

The chopping mechanism is detachably mounted upon the main frame and comprises an inverted U-shaped auxiliary frame 18 arranged vertically between the side bars 1ª of the main frame and the beams 8 and extending below the latter. The upper portion of this auxiliary frame 18 is detachably secured to the sides of the arched axle 3 in any suitable manner, being provided in the present instance with rearwardly extending arms 19 fastened to the axle by securing bolts 20.

Journaled in bearings 21 and 22 on one of the bars 1ª and the upper portion of the auxiliary frame 18 is a countershaft or power transmission shaft 23 carrying at its outer end a sprocket pinion 24, which is connected by a drive chain 25 with a sprocket wheel 26 on the hub of the adjacent driving wheel 5 or a sleeve connected therewith and journaled on the supporting spindle for said wheel, by which construction the shaft 23 is operated when the machine is in motion. Any suitable type of clutch device, not shown, may be employed for throwing the sprocket wheel 26 into and out of operation, if desired. The inner end of the shaft 23 carries a bevel gear 27 which meshes with a bevel gear 28 on a vertical shaft 29. The shaft 29 is suitably journaled at its upper end in the upper cross bar of the frame 18 and at its lower end in a lower cross bar 30 slidably mounted on the depending vertical arms of said frame. The gear 28 is hollow for the passage of the upper end of the shaft 29 and is journaled in any suitable manner upon the upper cross bar of the frame 18 to hold it against longitudinal movement with the shaft, while permitting it to rotate therewith, said shaft being adjustable through the upper part of the frame and the gear 28 and coupled at its lower end in any suitable manner to the cross bar 30 to adapt it to turn in said bar and to be moved upward and downward thereby. The bore of the gear 28 may be angular and the upper end of the shaft of corresponding form to adapt said gear to turn with the shaft and the latter to slide therethrough. On the lower end of the shaft below the cross bar 30 is a bevel gear 31 provided with a sleeve 32 socketed to receive the lower end of the shaft, and forming the journal for such end of the shaft, which journal turns in a suitable bearing 33 on the bar and is connected in any preferred manner with said bar so that when the bar is moved up and down the shaft and gear will move therewith. The gear 31 meshes with a bevel gear 34 on the forward end of a shaft 35 which is journaled in a substantially U-shaped bracket 36 projecting rearwardly from the frame 18 and disposed in a horizontal plane.

The forward ends of the arms of the bracket 36 are provided with cuffs or sleeves 37 to slide on the arms of the frame 18 and carry spindles 38 to revolubly support a pair of colter wheels or disks 39 which project in operation below the frame 18 to enter the earth, regulate the working position of the chopper, hereinafter described, and cut the weeds and trash and otherwise prepare the way for the action of the chopper. These colter or cutter wheels, which are arranged to operate in parallel planes on opposite sides of the line of action of the chopper, are adjustable up and down with the chopper and the bracket 36, so as to regulate the height of action of the operating parts according to the character of the ground and to throw them into and out of action, as will be readily understood.

The chopper is mounted upon the rear end of the shaft 35 and comprises an annular band or split ring 40 of steel, the ends 41 of which are cut away obliquely at reverse angles and, together with the edges 41ª of the split half of the ring, are beveled or ground to form cutters 40ª and 40ᵇ and are arranged a suitable distance apart to provide a clearance space for the standing plants. It will thus be seen that the two cutters 40ª and 40ᵇ project in opposite directions beyond the body of the band at oblique angles to each other, and that their cutting ends 41 and 41' and cutting edges 41ª are beveled on the reverse sides of the chopper. Cutting ends 41 are offset out of longitudinal alinement with one another, so that the end of the acting cutter will have a clear path of projection and operation without interference from the end of the inactive cutter and so that the edges 41ª will be oblique to the plane of rotation for a draw cut.

The chopper is rotated in operation to the right, and hence the cutter 40ª constitutes the forward or active cutter, the end of which is obliquely cut away and beveled and its rear edge beveled to form a cutting surface, while the end of the inactive cutter 40ᵇ is reversely cut away at an oblique angle and beveled and its front edge beveled, its cutting surfaces being therefore reverse to those of the cutter 40ª.

The chopper is provided with a central hub or sleeve 42 which is detachably mounted upon the shaft 35 by a set screw or other securing device 43, and from said hub extend threaded stems 44, which are coupled to spokes or stems 45 fixed to diametrically opposite sides of the chopper ring by turn buckles or other equivalent coupling and adjusting devices 46. By this construction of mounting, the chopper is firmly supported from the shaft and provision is made through the medium of the coupling devices to expand and contract said chopper so as to regulate the relative arrangement of the cutting ends 41 and the sides of the clearance space between the same, as occasion may require. When one of the cutting ends 41 and edge 41ª of one cutter become dulled, the chopper may be removed from the shaft and reversed to bring the other cutter into position for action, as will be readily understood. In action the edge and coacting end of the front cutter 40ª facing in the direction of rotation of the cutter operate to cut out some of the plants, the opening between the ends 41 providing a passage for the other plants, which will thus be missed by the cutter and allowed to stand.

In reversing the chopper to bring the outer cutter 40ᵇ into the position formerly occupied by the cutter 40ª, the set screw 43 is loosened, the cutter removed and turned half way around and reapplied and fastened by the set screw, whereupon the cutter 40ᵇ will operate as the active cutter, while the cutter 40ª will become the inactive cutter.

In order to provide for the adjustment of the bracket 36, a bridge piece 47 is provided to connect the same with the bar 30, and to this bridge piece is connected the lower end of a chain 48 which is secured at its upper end to a bell crank adjusting lever 49, said lever being journaled upon a pivot pin 50 carried by a segment rack 51 secured to the axle 3 and provided with a pawl 52 to engage the teeth of the rack, by which the lever may be locked in adjusted position. As a result of this construction it will be seen that the bracket 36, carrying with it the colters or disk cutters 39, and the rotary chopper 40, which turns in a plane at right angles to said disk or cross-wise of the machine, may be vertically adjusted on the frame 18 to regulate the depth of penetration of the disks and the operative position of the chopper, as well as to elevate said devices to an inoperative position above the surface of the ground, the shaft 29 in this operation sliding upward with the bracket and bar 30 and through the gear 28 to maintain the meshing engagement between the gears 27 and 28 and 31 and 34. The shaft 35 extends forwardly beyond the line of the disks 39 and may carry a reel or series of blades 35ª to sweep aside trash or to turn a long stalk, such as a corn stalk, around so as to lie in the path of and be cut by the disks.

In the operation of the device, it will be apparent that as the implement is drawn across the field and over and along the row of plants, the colter disks will be turned by contact with the soil to cut out the weeds and trash and to prepare the way for the action of the rotary chopper 40, which will be operated by the gearing to cut or thin out the plants. By adjusting the disks and chopper through the adjusting mechanism before described, the position of said parts may be regulated as circumstances may require, or they may be altogether thrown out of operation, as during the transportation of the machine from row to row or from place to place.

By constructing the chopping mechanism as described and mounting the same upon a supplemental frame 18 of the character set forth, such mechanism is adapted for application to any ordinary type of cotton cultivator, with very slight changes for the application of the sprocket driving gearing. The chopping mechanism may, however, be mounted upon a frame of the construction described to provide a combined chopper and cultivator, from which the chopping mechanism may be removed whenever it is desired to use the implement simply as a cultivator.

Having thus fully described the invention, what is claimed as new is:—

1. A cotton chopping device comprising a split band having its ends spaced apart and offset at reverse oblique angles to each other, said ends having their extremities and opposite side edges beveled to form reverse cutters, a sleeve provided with a securing device for fastening the band upon a rotating shaft, threaded stems upon the sleeve and sides of the band, and turn buckles connecting said stems to support said band from the sleeve and to expand and contract the band.

2. A chopping device comprising a split band having its ends offset out of alinement and formed to provide cutting surfaces for action in opposite directions of revolution of said device, means for detachably and reversibly mounting the band upon a supporting shaft, and means associated with said supporting means to contract and expand the band.

3. A cotton chopping attachment for cultivators comprising a supporting frame having bracket arms at its upper end for attachment to the main frame of the cultivator, a bracket slidably mounted on the lower portion of said supporting frame, a bar slidably mounted on said supporting frame above said bracket, an arm connecting the bar and bracket, adjusting means connected with said arm, a horizontal shaft journaled on the bracket, a gear upon the horizontal shaft, a gear journaled on the bar and meshing with said gear on the horizontal shaft, a hollow gear journaled on the upper portion of the supporting frame and having an angular bore, a vertical shaft connected with the gear on the bar and slidable through the bore of the gear on the upper portion of the frame, means for transmitting motion to the latter-named gear, and a rotary chopper mounted on said horizontal shaft.

In testimony whereof I affix my signature in presence of two witnesses.

WILLIAM A. CROW.

Witnesses:
S. O. WILSON,
J. F. COFFIELD, Jr.